US009160589B1

(12) United States Patent
Ramlall (10) Patent No.: US 9,160,589 B1
(45) Date of Patent: Oct. 13, 2015

(54) BIASED ESTIMATION OF SYMBOL TIMING OFFSET IN OFDM SYSTEMS

(71) Applicant: The United States of America as represented by the Secretary of the Navy, Washington, DC (US)

(72) Inventor: Rohan Y. Ramlall, Brentwood, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 61 days.

(21) Appl. No.: 14/212,859

(22) Filed: Mar. 14, 2014

Related U.S. Application Data

(63) Continuation-in-part of application No. 14/091,048, filed on Nov. 26, 2013, now Pat. No. 9,083,596.

(51) Int. Cl.
*H04L 27/28* (2006.01)
*H04L 27/26* (2006.01)

(52) U.S. Cl.
CPC .................................... *H04L 27/26* (2013.01)

(58) Field of Classification Search
CPC .............. H04L 27/362; H04L 27/2657; H04L 2027/0026
USPC ......................................... 375/260, 344, 343
See application file for complete search history.

(56) References Cited

U.S. PATENT DOCUMENTS

| | | | | |
|---|---|---|---|---|
| 7,680,197 | B2 * | 3/2010 | Liu et al. ........................ | 375/260 |
| 8,218,665 | B2 | 7/2012 | Chin et al. | |
| 8,594,211 | B2 | 11/2013 | Ahmad | |
| 2007/0217525 | A1 * | 9/2007 | Vrcelj et al. .................. | 375/260 |
| 2014/0169501 | A1 * | 6/2014 | Nazarathy et al. ............ | 375/316 |

OTHER PUBLICATIONS

J. Diez, D. De Castro, J.M. Palomo, M. Tossaint, "Integrated navigation and communication system based on OFDM," 2010 5th ESA Workshop on Satellite Navigation Technologies and European Workshop on GNSS Signals and Signal Process. NAVITEC, pp. 1-5, Dec. 8-10, 2010.

(Continued)

*Primary Examiner* — Daniel Washburn
*Assistant Examiner* — Fitwi Hailegiorgis
(74) *Attorney, Agent, or Firm* — SPAWAR Systems Center Pacific; Kyle Eppele; Ryan J. Friedl (57) ABSTRACT

A system and method involve subtracting a positive bias from a symbol timing offset estimate determined by an estimator in an orthogonal frequency division multiplexing (OFDM) receiver. The bias may be determined based upon a channel order and/or the length of a cyclic prefix of a received OFDM symbol. If based upon the length of the cyclic prefix, the bias may be less than or equal to half the length of the cyclic prefix. The estimator may be a blind estimator, a coarse estimator, or a blind coarse estimator. The OFDM receiver may have $$\frac{N_{cp}}{2} + 1$$

parallel channels, where $N_{cp}$ is the number of samples of a cyclic prefix of the received OFDM symbol, where the positive bias is different for each channel.

11 Claims, 10 Drawing Sheets

(56) References Cited

OTHER PUBLICATIONS

F. Zanier, M. Luise, "Fundamental issues in time-delay estimation of multicarrier signals with applications to next-generation GNSS," 2008 SPSC 10th Int. Workshop on Signal Process for Space Commun., vol., no., pp. 1-8, Oct. 6-8, 2008.
J.J. Van De Beek, M. Sandell, P.O. Botjesson, "ML estimation of time and frequency offset in OFDM systems," IEEE Trans. Signal Process, vol. 45, No. 7, pp. 1800-1805, Jul. 1997.
D. Landstrom, S. Wilson, J.J. Van De Beek, P. Odling, P.O. Botjesson, "Symbol time offset estimation in coherent OFDM systems," IEEE Trans. Commun., vol. 50, No. 4, pp. 545-549, Apr. 2002.
J.A. Lopez-Salcedo, E. Gutierrez G. Seco-Granados, A.L., Swinehurst, "Unified framework for the synchronization of flexible multicarrier communication signals," IEEE Trans. Signal Process., vol. 61, No. 4, pp. 828-842, Feb. 2013.
W.L. Chin, "ML Estimation of Timing and Frequency Offsets Using Distinctive Correlation Characteristics of OFDM Signals Over Dispersive Fading Channels," IEEE Trans. Veh. Technology, vol. 60, No. 2, pp. 444-456, Feb. 2011.
D. Lee; K. Cheun, "Coarse symbol synchronization algorithms for OFDM systems in multipath channels," IEEE Commun. Lett., vol. 6, No. 10, pp. 446-448, Oct. 2002.
R. Mo, Y. Chew, T. Tjhung, C. Ko, "A joint blind timing and frequency offset estimator for OFDM systems over frequency selective fading channels," IEEE Trans. Wireless Commun., vol. 5, No. 9, pp. 2594-2604, Sep. 2006.
R. Martin, J. Velotta, J. Raquet, "Bandwidth Efficient Cooperative TDOA Computation for Multicarrier Signals of Opportunity," IEEE Trans. Signal Process., vol. 57, No. 6, pp. 2311-2322, Jun. 2009.
M. Speth, F. Classen, H. Meyr, "Frame synchronization of OFDM systems in frequency selective fading channels," 1997 IEEE 47th Veh. Technology Conf., vol. 3, no., pp. 1807-1811, May 4-7, 1997.
J. McNeff, "Changing the Game Changer—The Way Ahead for Military PNT," Inside GNSS, vol. 5, No. 8, pp. 44-51, Dec. 2010.
Yang, B. et al., "Timing Recovery for OFDM Transmission", IEEE J. Sel. Areas Commun., vol. 18, No. 11, pp. 2278-2291, Nov. 2000.
Stuber, G. et al., "Broadband MIMO-OFDM Wireless Communications", Proc. of the IEEE, vol. 92, No. 2, pp. 271-294, Feb. 2004.
Mostofi, Y. et al., "A Robust Timing Synchronization Design in OFDM Systems—Part I: Low-Mobility Cases", IEEE Wireless Commun., vol. 6, No. 12, pp. 4329-4339, Dec. 2007.
Mostofi, Y. et al., "A Robust Timing Synchronization Design in OFDM Systems—Part II: High-Mobility Cases", IEEE Trans. Wireless Commun., vol. 6, No. 12, pp. 4340-4348, Dec. 2007.
Chin, W., et al., "A Blind Synchronizer for OFDM Systems Based on SINR Maximization in Multipath Fading Channels," IEEE Trans. Veh. Technol., vol. 58, No. 2, pp. 625-635, Feb. 2009.
Al-Dweik ,A. et al., "Efficient OFDM Symbol Timing Estimator Using Power Difference Measurements," IEEE Trans. Veh. Technol., vol. 61, No. 2, pp. 509-520, Feb. 2012.
Jacobsen, E. et al., "The sliding DFT," IEEE Signal Process, Magazine, vol. 20, No. 2, pp. 74-80, Mar. 2003.
Jacobsen, E. et al., "An update to the sliding DFT," Signal Processing Magazine, IEEE , vol. 21, No. 1, pp. 110-111, Jan. 2004.

\* cited by examiner

BIASED ESTIMATION OF SYMBOL TIMING OFFSET IN OFDM SYSTEMS

CROSS-REFERENCE TO RELATED APPLICATIONS

This application is a continuation-in-part of U.S. patent application Ser. No. 14/091,048, filed on Nov. 26, 2013, entitled "Non-Data-Aided Joint Time and Frequency Offset Estimate Method for OFDM Systems Using Channel Order Based Regression," the content of which is fully incorporated by reference herein.

FEDERALLY-SPONSORED RESEARCH AND DEVELOPMENT

The Biased Estimation of Symbol Timing Offset in OFDM Systems is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102903.

BACKGROUND

Orthogonal frequency division multiplexing (OFDM) is a popular multicarrier modulation method that has been adopted in numerous standards such as IEEE 802.11a/g, DVB-T/T2, and LTE. Some of the key advantages of OFDM are its high spectral efficiency, robustness to inter-symbol interference (ISI) caused by multipath, and its ability to equalize wideband channels. However, OFDM is sensitive to time and frequency offsets, which need to be estimated in order to correctly demodulate the received data.

Some techniques focus on blindly estimating these offsets without the use of training data. Typically, the maximum likelihood (ML) principle has been used in these approaches because it guarantees asymptotically unbiased and consistent estimates. However, the mutual orthogonality of the OFDM subcarriers is preserved only if the estimated timing error lies in the lock-in region. The previously proposed estimators have been designed to accurately estimate the symbol time offset (STO), but not necessarily designed to lock-in with high probability.

DETAILED DESCRIPTION OF SOME EMBODIMENTS

The subject matter disclosed herein involves investigation of subtracting a positive bias from the coarse STO estimate and analyzing its influence on the lock-in probability. An optimal value for the bias term is derived for the unbiased coarse STO estimator. In some embodiments, this optimal value depends on the length of the cyclic prefix. In some embodiments, this optimal value depends on the channel order. In some embodiments, this optimal value depends on the length of the cyclic prefix and the channel order.

In general, the low-pass frequency-selective channel model is given by $$h(t) = \sum_{l=0}^{L-1} h_l \delta(t - lT_s) \quad \text{(Eq. 1)}$$

where L is the order of the channel, $h_l$ is the complex amplitude of the l-th multipath arrival, and $T_s$ is the sampling period. In OFDM systems, the channel is divided into sub-channels (i.e., mutually orthogonal subcarriers), so that each subcarrier experiences flat fading. The transmitted OFDM symbol s(n) n=0, . . . , N+$N_{cp}$−1 is produced by taking the N point inverse fast Fourier transform (IFFT) of the modulated data symbols {$x_d$, d=0, . . . , N−1} and pre-pending the last $N_{cp}$ samples, where the length of the cyclic prefix is greater than or equal to the order of the channel (i.e., $N_{cp} \geq L$). The cyclic prefix serves as a time guard interval that eliminates ISI between adjacent OFDM symbols. The critically sampled (i.e., N+$N_{cp}$ samples per OFDM symbol) received OFDM signal is given by $$r(k) = e^{j2\pi\varepsilon k/N} \sum_{l=0}^{L-1} h_l s_{k-l} + n_k \quad \text{(Eq. 2)}$$

$$k = 0, \ldots, \theta, \ldots, 2N + N_{cp} - 1$$

where $\theta \in [0, N-1]$ is the integer STO, $\epsilon \in (-0.5, 0.5]$ is the carrier frequency offset (CFO) normalized to $1/NT_s$, and n is additive white Gaussian noise (AWGN) with variance $\sigma_n^2$. The STO $\theta$ is defined to be the first arrival path received (i.e., the first sample of the received OFDM symbol still including the cyclic prefix). Since $\theta$ is unknown, $2N+N_{cp}$ samples, as opposed to $N+N_{cp}$ samples, need to be collected at the receiver in order to estimate $\theta$. However, only one complete OFDM symbol is actually contained in the received samples.

Figure 1A:
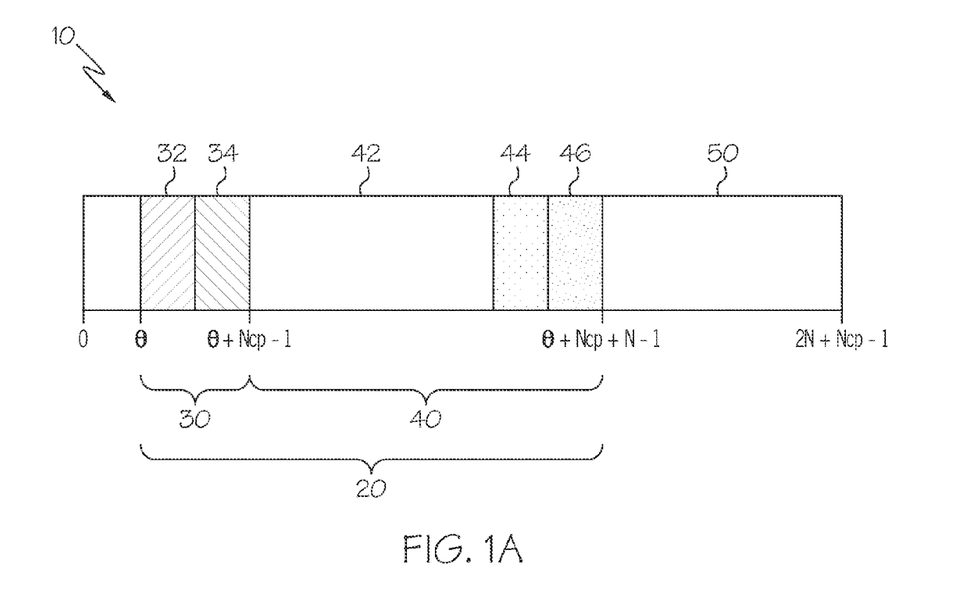
FIG. 1A shows a diagram of an OFDM signal containing a complete OFDM data symbol.
Figure 1B:
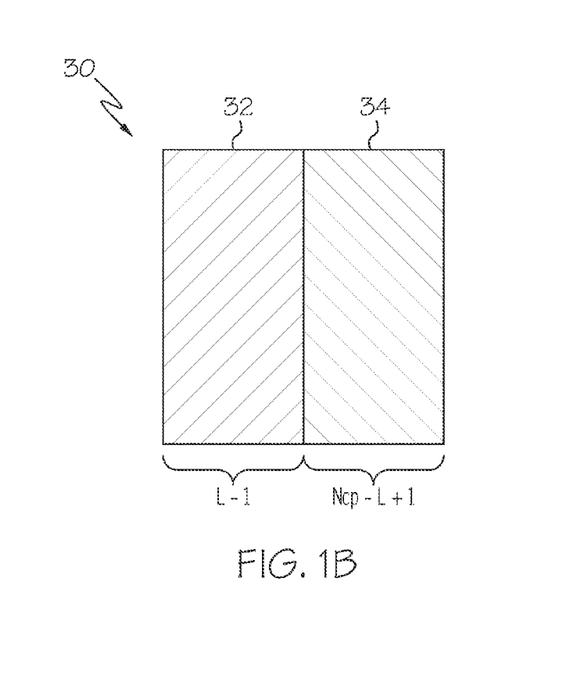
FIG. 1B shows a diagram of the cyclic prefix portion of the OFDM data symbol shown in FIG. 1.

FIG. 1A shows a received OFDM signal 10 containing a complete OFDM symbol 20. Symbol 20 includes a cyclic prefix 30 and a data portion 40. Cyclic prefix includes an inter-symbol interference (ISI) region 32 and an ISI-free region 34. Data portion 40 includes a first data portion 42, a second data portion 44, and a third data portion 46. Data portion 40 contains samples representing the transmitted OFDM symbol. First data portion 42 represents the samples that have not been affected by interference. Second data portion 44 is a data region that corresponds to ISI region 32. Third data portion 46 is a data region that corresponds to ISI-free region 34. As shown in FIG. 1B, ISI region 32 has a length of $L-1$ and ISI-free region 34 has a length of $N_{cp}-L+1$. In the samples given by (Eq. 2), there are $N_{cp}-L+1$ inter-symbol interference (ISI) free samples and $L-1$ ISI samples in the cyclic prefix of the received OFDM symbol.

Figure 2:
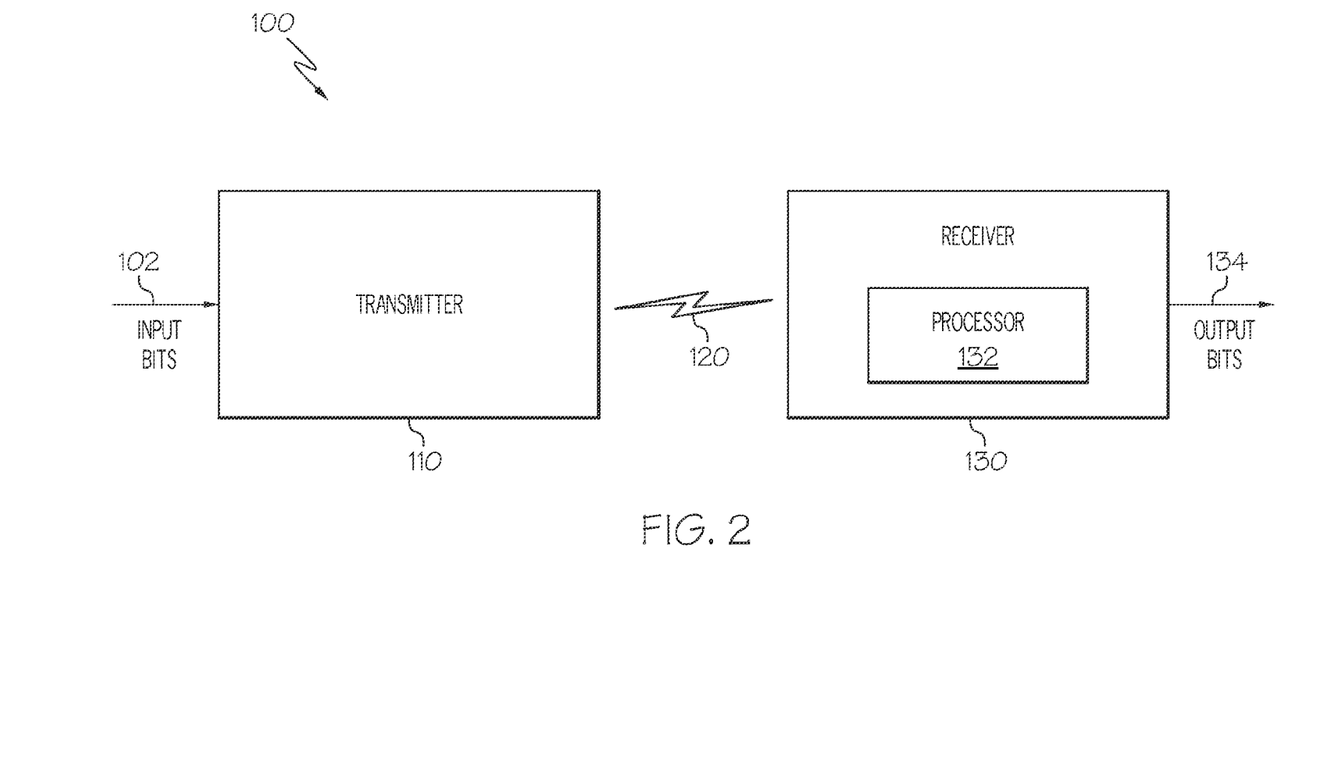
FIG. 2 shows a general block diagram of an embodiment of an OFDM system.

FIG. 2 shows a general block diagram of an embodiment of an OFDM system 100. Input bits 102 are input into transmitter 110, which sends a signal 120 to receiver 130 having a processor 132 therein. OFDM receiver 130 processes the received signal and outputs output bits 134. In some embodiments, processor 132 is configured, via circuitry and/or software embedded within or otherwise accessible to processor 132, to subtract a positive bias from a symbol timing offset (STO) estimate determined by an estimator in OFDM receiver 130. In such embodiments, the bias may be less than or equal to half the length of a cyclic prefix of a received OFDM symbol, such as symbol 20 shown in FIG. 1A. In some embodiments, receiver 130 is configured similarly to receiver 240 shown in FIG. 3 or receiver 300 shown in FIG. 4.

In some embodiments, the estimator is a blind estimator. In some embodiments, the estimator is a coarse estimator. In some embodiments, the estimator is a blind coarse estimator. As used herein, the term "blind estimator" refers to an estimator that only uses knowledge of the number of samples of the cyclic prefix and the number of data samples of a received OFDM symbol. As used herein, the term "coarse estimator" refers to an estimator where the estimation process occurs before the fast Fourier transform (FFT) is applied to the received OFDM symbol. A "blind coarse estimator" is a combination of the blind estimator and the coarse estimator.

Figure 3:
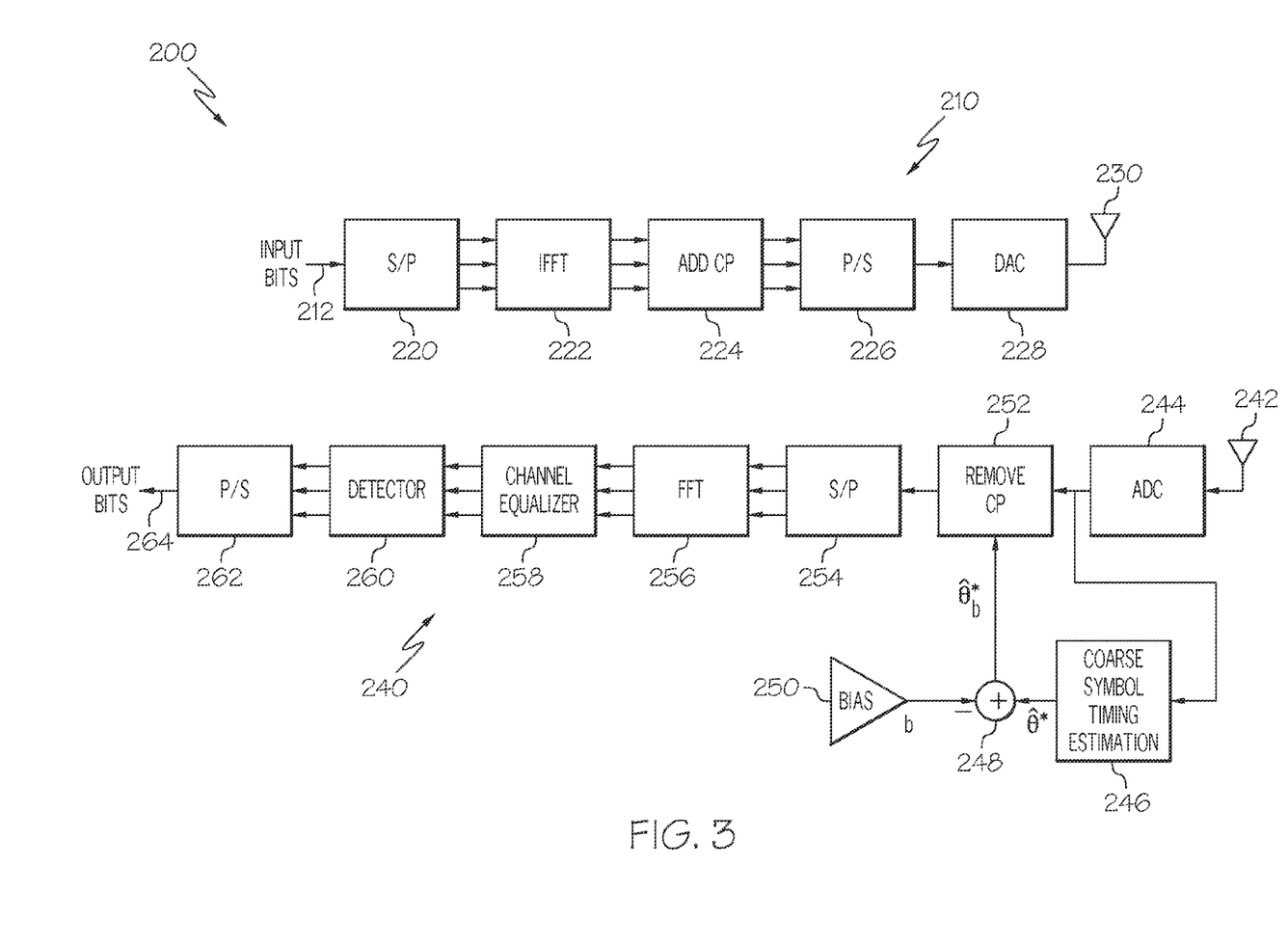
FIG. 3 shows a detailed block diagram of an embodiment of an OFDM system.

FIG. 3 shows a detailed block diagram of an embodiment of an OFDM system 200.

System 200 includes a transmitter 210 and a receiver 240. Input bits 212 are input into transmitter 210 and the signal is converted from serial to parallel by converter 220. An IFFT is then applied at component 222 and a cyclic prefix is added at component 224. The signal is converted from parallel to serial at converter 226, then from digital to analog at converter 228, and then transmitted via antenna 230 to receiver 240.

The transmitted signal is received by receiver 240 via antenna 242. The signal is converted from analog to digital via converter 244. Next, the coarse symbol timing estimate $\hat{\theta}^*$ is determined by component 246. The estimate is summed by summer 248 with a bias b generated by component 250 and the resulting symbol timing estimate $\hat{\theta}^*_b$ is used by component 252 in the process of removing the cyclic prefix from the symbols. The resulting signal is converted from serial to parallel by converter 254 and then an FFT is applied by component 256. The channel is then equalized by equalizer 258, the signal is demodulated by detector 260, and the bits are converted from parallel to serial by converter 262. The resulting output bits 264 are then output from receiver 240.

The subtraction of a positive bias from the blind coarse STO estimate is a time domain technique to improve the synchronization of the OFDM receiver. However, it is only the first step in the time synchronization process. There are methods to improve the synchronization after the N point FFT is applied, which all require an initial coarse STO estimate. As discussed herein, a parallel architecture is proposed where each of the $N_{cp}/2+1$ possible biases are used to control the FFT window (see FIG. 4). The reasoning behind the proposed architecture is that a bound is provided on the optimal bias value, but does not determine which bias value is optimal. Therefore, the $N_{cp}/2+1$ most likely sets of FFT windows are provided to the next step in the time synchronization process, so that it is likely that the mutual orthogonality of the subcarriers is preserved in at least one of the sets.

Instead of applying $N_{cp}/2+1$ separate FFT operations (which has a computational complexity of $O[(N_{cp}/2+1)/N \log_2 N])$, the sliding digital Fourier transform (SDFT) can be used to reduce the computational complexity. The SDFT algorithm works as follows: let $\vec{x}(n-1) = \{x(0), x(1), \ldots, x(N-1)\}$ and $\vec{x}(n) = \{x(1), x(2), \ldots, x(N)\}$ be two successive length N sequences. Denote the $k^{th}$ spectral component of the sequence $\vec{x}(n-1)$ by $X_k(n-1)$ and the $k^{th}$ spectral component of the sequence $\vec{x}(n)$ by $X_k(n)$. Then, $$X_k(n) = e^{j2\pi k/N}(X_k(n-1) + x(n) - x(n-N)). \tag{Eq. 3}$$

Since the biases produce $N_{cp}/2+1$ successive length N sequences, the SDFT can be used where each successive subcarrier only requires one complex multiplication and two additions. This can be extremely useful if the synchronization method only uses a small subset of the subcarriers. If all N subcarriers are needed by the synchronization methods, then the computational complexity using the SDFT is $O[N \log_2 N + (N_{cp}/2)N]$, which is lower in computational complexity than computing $N_{cp}/2+1$ FFTs and lower in memory requirements than using the sliding FFT.

Figure 4:
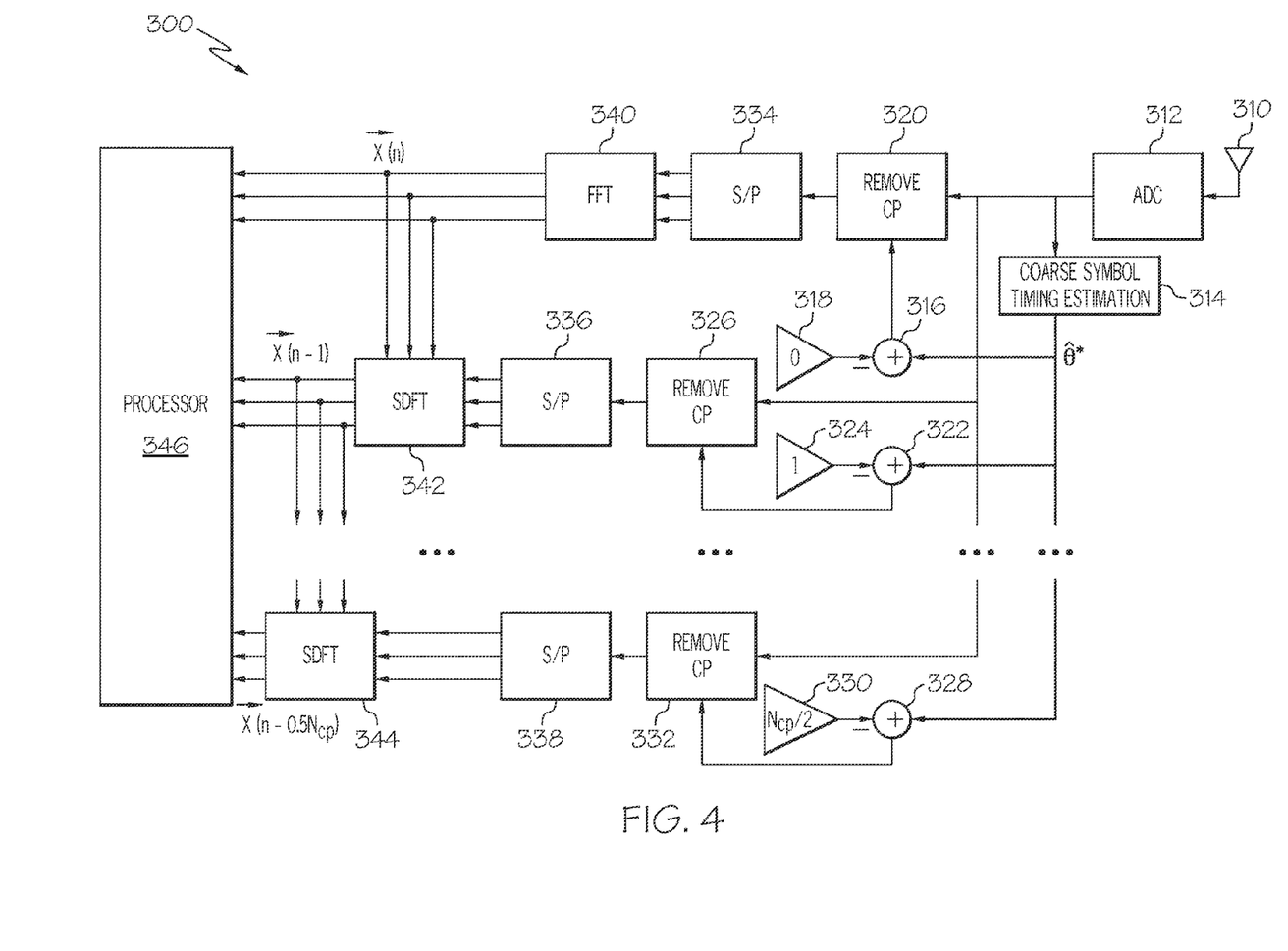
FIG. 4 shows a detailed block diagram of an embodiment of an OFDM receiver.

FIG. 4 shows a detailed block diagram of an embodiment of an OFDM receiver 300. A signal is received by antenna 310 and converted from analog to digital by converter 312. Next, the coarse symbol timing estimate $\hat{\theta}^*$ is determined by component 314. The resultant estimation is provided to summers for each separate receiver channel. Summer 316 combines the estimate with a bias b generated by component 318 and the resulting symbol timing estimate $\hat{\theta}^*_b$ is used by component 320 in the process of removing the cyclic prefix from the symbols of that channel. Summer 322 combines the estimate with a bias b generated by component 324 and the resulting symbol timing estimate $\hat{\theta}^*_b$ is used by component 326 in the process of removing the cyclic prefix from the symbols of that channel. Summer 328 combines the estimate with a bias b generated by component 330 and the resulting symbol timing estimate $\hat{\theta}^*_b$ is used by component 332 in the process of removing the cyclic prefix from the symbols of that channel.

After the cyclic prefix has been removed, the signals in the channels are converted from serial to parallel by converters 334, 336, and 338, respectively. Then, FFT component 340 first applies a FFT to the output from converter 334. Then, SDFT component 342 applies a sliding digital Fourier transform (SDFT) to the output from converter 336. Finally, SDFT component 344 applies an SDFT to the output from converter 338. The resultant signals from FFT component 340 and SDFT components 342 and 344 are sent to processor 346 where post FFT synchronization methods are applied. In some embodiments, processor 346 is configured, via circuitry and/or software embedded within or otherwise accessible to processor 346, to process the received signals for application-specific purposes.

Additionally, the resultant signals from preceding channel SDFT components are sent to succeeding channel SDFT components. This is done in accordance with Eq. 3, where the preceding channel's spectral components are needed to compute the succeeding channel's spectral components. For example, FFT component 340 sends its resultant signals to SDFT component 342.

Processor 346 is also configured to use post FFT synchronization methods to determine which of the resultant signals (the signals from FFT component 340 and SDFT components 342 and 344 for example) only contains samples that have not been affected by ISI. Once this ISI-free signal is determined, the signal can be processed as shown after component 256 in FIG. 3.

The probability that the symbol timing error lies in the ISI free region of the received cyclic prefix (i.e., $P(L-1-N_{cp} \leq \hat{\theta}^* - \theta \leq 0)$ where $\hat{\theta}^* - \theta$ is the symbol timing error) is called the lock-in probability. If lock-in occurs, demodulation can successfully be accomplished using the FFT, since the mutual orthogonality of the subcarriers is preserved and the resulting phase offset can easily be corrected. If lock-in does not occur, the mutual orthogonality of the subcarriers is destroyed by the ISI and the bit error rate performance degrades.

Most of the coarse estimators presented in the literature evaluate a cost function for the N possible time offsets and then search for the maximum or minimum, which results in $\hat{\theta}^*$. The approach disclosed herein subtracts a bias $b \geq 0$ from $\hat{\theta}^*$, thus yielding a biased estimate $\hat{\theta}^* b = \hat{\theta}^* - b$.

The optimal value for the bias term can be found using probability theory. The variance of any estimator is given by $$\mathrm{Var}(\theta - \hat{\theta}^*) = E[(\theta - \hat{\theta}^*)^2] - (E[\theta - \hat{\theta}^*])^2 \quad \text{(Eq. 4)}$$

where the first term on the right hand side (RHS) is the mean squared error (MSE) and the second term on the RHS is the bias squared. There are two cases to distinguish between depending on whether or not the coarse STO estimator is unbiased or biased. As used herein, unbiased and biased refer to the property of the estimator without introducing a bias term b. An unbiased estimator is an estimator whose expected value is equal to the parameter being estimated; thus, the bias term in (Eq. 4) is zero. Therefore, the expected value of the estimator with the addition of the bias term $b \geq 0$ is $$E[\hat{\theta}^* - b] = \theta - b \quad \text{(Eq. 5)}$$

Since the lock-in region holds for $L-1-N_{cp} \leq \theta - \theta \leq 0$, introducing the bias term to the estimator and applying the expectation operator yields $$L - 1 - N_{cp} \leq -b \leq 0 \quad \text{(Eq. 6)}$$

Assuming the estimator is consistent, the optimal value for b is given by $$b_{opt,1} = -\frac{L - 1 - N_{cp}}{2} \quad \text{(Eq. 7)}$$

This value makes sense since it moves the expected value of the symbol timing error from zero to the middle of the lock-in region, thus increasing the lock-in probability.

Figure 5:
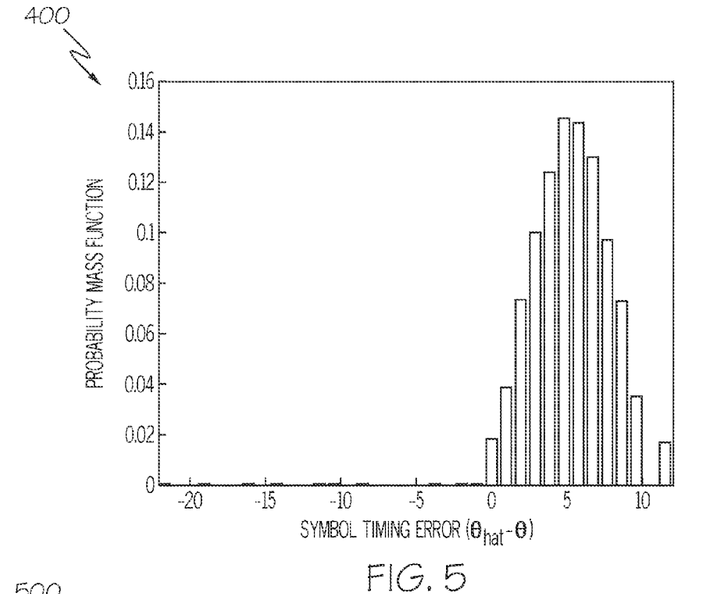
FIG. 5 shows a graph illustrating the probability mass function of symbol timing error for a conditional ML estimator.

The MSE performance of many of the blind coarse STO estimators presented in the literature tend to saturate at higher signal-to-noise ratio (SNR) especially in multipath channels, so even though the estimators were derived for single path channels using the ML principle, they are neither asymptotically unbiased nor consistent for multipath channels. However, many of the blind coarse STO estimators in the literature exhibit a similar error probability mass function to that shown in graph 400 of FIG. 5. Since there tends to be an offset that moves the symbol timing error out of the lock-in region, it is clear that adding a bias term can help bring the timing error back into the lock-in region, thus improving the lock-in probability.

The optimal value for the bias b is channel dependent for the conditional ML (CML) estimator. In the next section, simulation results are presented assuming the channel coefficients are independent and identically distributed with a uniform power delay profile. For this case, the optimal value for b is given by $$b_{opt,2} = \frac{N_{cp}}{2} \quad \text{(Eq. 8)}$$

which does not depend on the channel order as in (Eq. 7).

Additionally, both the unconditional ML (UML) and CML estimators exploit the correlation between the data portion of the OFDM signal and its corresponding cyclic prefix. It can be shown that the correlation between the received OFDM samples $r(k)$ and $r(k+N)$ is $$E[r(k)r^*(k+N)] = \begin{cases} e^{-j2\pi\varepsilon}\sigma_s^2 \sum_{l=0}^{k-\theta} h(l)h^*(l), & k \in I_1 \\ e^{-j2\pi\varepsilon}\sigma_s^2 \sum_{l=0}^{L-1} h(l)h^*(l), & k \in I_2 \\ e^{-j2\pi\varepsilon}\sigma_s^2 \sum_{l=k-N_{cp}+1}^{L-1} h(l)h^*(l), & k \in I_3 \\ 0, & \text{otherwise} \end{cases} \quad \text{(Eq. 9)}$$

where $\varepsilon$ is the carrier frequency offset, $\sigma_s^2$ is the signal power, $h(l)$ is the complex amplitude of the l-th multipath arrival, $I_1 = \{\theta, \theta+1, \ldots, \theta+L-2\}$, $I_2 = \{\theta+L-1, \theta+L, \ldots, \theta+N_{cp}-1\}$, and $I_3 = \{\theta+N_{cp}, \theta+N_{cp}+1, \ldots, \theta+N_{cp}+L-2\}$. It can also be shown that the zero lag correlation is constant for all values of k, so it can be ignored in the analysis of the CML estimator.

The UML and CML estimators accumulate $N_{cp}$ consecutive values of the correlation values, i.e., $$\sum_{k=\hat{\theta}}^{\hat{\theta}+N_{cp}-1} r(k)r^*(k+N) \quad \text{(Eq. 10)}$$

for $\hat{\theta} = 0, \ldots, N-1$. Since the estimators were derived under the assumption of a single path channel, the desired correlation values belong to $I_2$ and the undesired correlation values belong to $I_1$ and $I_3$. $I_3$ moves the STO estimate outside of the lock-in region for multipath channels, since its correlation values cause the set of maximum accumulated correlation values to increase in value (for clarity, the set consists of STO estimates where each estimate has a corresponding accumulated correlation value; the STO estimates increase in value).

Applying the expectation operator to (Eq. 10) and substituting (Eq. 9) yields the expected accumulated correlation values.

On average, the $N_{cp}-L+2$ STO estimates that yield the largest accumulated correlation values are the most likely estimates produced by the UML and CML STO estimators. In order to ensure that these STO estimates fall within the lock-in region, a bias $b \geq 0$ is subtracted from $\hat{\theta}^*$, thus yielding a biased estimate $\hat{\theta}^*_b = \hat{\theta}^* - b$ and increasing the lock-in probability. The optimal bias is given by the value of b that moves these $N_{cp}-L+2$ STO estimates into the lock-in region (i.e., $L-1-N_{cp} \leq \hat{\theta}^*_b - \theta \leq 0$).

Note that this approach for determining the optimal bias is applicable to any channel, however the drawback is that the optimal bias is dependent on the channel (since the correlation between the received samples r(k) and r(k+N) depends on the channel coefficients), which is not ideal for blind estimators. Next, a bound for the optimal bias is determined that is independent of the channel.

The "worst case" channel model results in the largest expected correlation between the received samples r(k) and r(k+N) for k∈$I_3$, which causes the set of maximum accumulated correlation values to increase in value the most. This is attained by a length $N_{cp}$ channel where all the channel coefficients are zero, except the last one.

The UML and CML estimators accumulate $N_{cp}$ consecutive values of the correlation values as in (Eq. 10). Applying the expectation operator to (Eq. 10), the goal is to find a channel h that results in the largest symbol timing error, i.e., $$\max \hat{\theta}^* - \theta \text{ subject to} \quad \text{(Eq. 11)}$$

$$\hat{\theta}^* = \underset{\hat{\theta} \in [0, N-1]}{\operatorname{argmax}} \sum_{k=\hat{\theta}}^{\hat{\theta}+N_{cp}-1} E[r(k)r^*(k+N)]$$

Looking at (Eq. 9), the correlation values in $I_2$ are the largest correlation values because they are proportional to the sum of the power of all the channel coefficients. However, the correlation values in $I_3$ equal the correlation values in $I_2$ only if $$h(l) = \begin{cases} 0, & 0 \leq l \leq L-2 \\ 1, & l = L-1 \end{cases} \quad \text{(Eq. 12)}$$

since all of the correlation values in $I_3$ include h(L−1) in their summations. Hence, the correlation values are equal for $\theta + L - 1 \leq k \leq \theta + N_{cp} + L - 2$ and 0 otherwise. In order to maximize the cost function in (3), L is set to its maximum value (i.e., $L = N_{cp}$). Therefore, the channel given by (Eq. 12) with $L = N_{cp}$ is the channel that results in the largest symbol timing error $\hat{\theta} - \theta = N_{cp} - 1$.

The most likely estimate produced by the UML and CML estimators is $\hat{\theta}^* = \theta + N_{cp} - 1$. Since the lock-in region holds for $L - 1 - N_{cp} \leq \hat{\theta}^*_b - \theta \leq 0$, which in this "worst case" translates to $-1 \leq \hat{\theta}^* b - \theta \leq 0$, the optimal bias b is given by either $N_{cp} - 1$ or $N_{cp}$ (assuming the received signal is critically sampled).

The "worst case" channel requires the largest bias to move the STO estimates within the lock-in region since it causes the set of maximum accumulated correlation values to increase in value the most. Therefore, the optimal bias value of the "worst case" channel model provides an upper bound on the optimal bias value for any channel.

In some embodiments, for any channel, the optimal bias is less than or equal to the length of the cyclic prefix (i.e., $b_{opt} \leq N_{cp}$). This optimal bias results in a higher lock-in probability, on average, than the unbiased UML or CML estimator.

In some embodiments, the upper bound determined above may be high, especially if one is interested in using the optimal bias for OFDM systems in certain wireless communication channels. It has been observed in measurements of wireless channels that the power delay profile (PDP) can be approximated by a decaying exponential function, so that the power of each tap decreases with the delay. In an effort to make the optimal bias bound tighter for realistic channels, but still be independent of the channel, the author proposes to upper bound the decaying exponential PDP by a uniform PDP of length $L = N_{cp}$. Since the uniform PDP channel causes the set of maximum accumulated correlation values to increase in value more than or equal to any exponential PDP, its optimal bias provides an upper bound on the optimal bias value for realistic channels.

To demonstrate the above, let the exponential PDP be given by $$P_{h,exp}(l) = \begin{cases} e^{-al}, & 0 \leq l \leq L-1 \\ 0, & \text{otherwise} \end{cases} \quad \text{(Eq. 13)}$$

where $a \geq 0$. Also, let $L = N_{cp}$ (if $L < N_{cp}$, the proof is trivial). There are two limiting cases: 1) $a \to \infty$ and 2) $a \to 0$. As $a \to \infty$, the channel approaches that of a single path channel and $\hat{\theta}^* = 0$ is the most likely estimate produced by the UML and CML estimators. As $a \to 0$, the channel approaches that of the uniform PDP. Therefore, the uniform PDP channel of length $L = N_{cp}$ causes the set of maximum accumulated correlation values to increase in value more than or equal to any exponential PDP.

Figure 10:
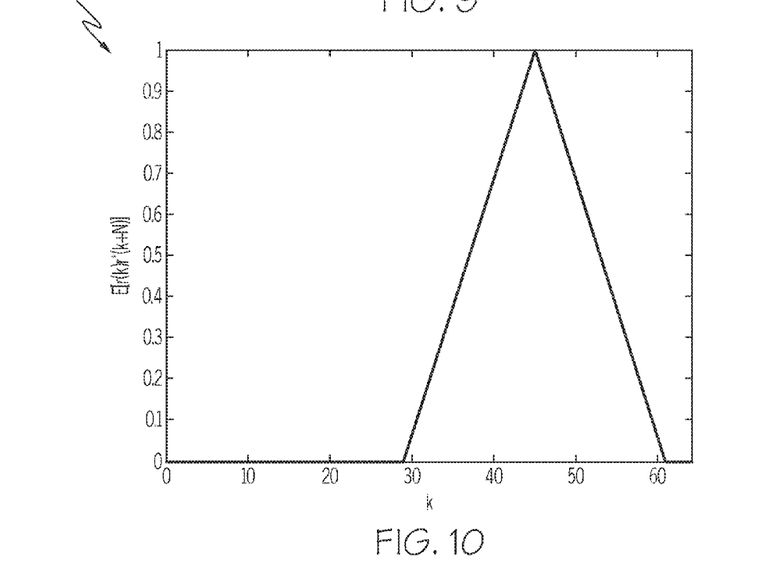
FIG. 10 shows a graph illustrating the mean of correlation between received samples in an OFDM system.

In the analysis of the uniform PDP of length $L = N_{cp}$, the channel coefficients are independent and identically distributed (i.i.d.) where the real and imaginary components are each normally distributed with variance 0.5. FIG. 10 depicts (Eq. 9) a graph 900 illustrating an example uniform PDP which shows that a symmetrical argument can be used to find that the maximum of the accumulated correlation values occurs at (Eq. 14) and the optimal bias is given by (Eq. 15).

$$\hat{\theta}^* = \theta + \frac{L-1}{2} \quad \text{(Eq. 14)}$$

$$b_{opt} = \frac{N_{cp}}{2} \quad \text{(Eq. 15)}$$

This leads to the proposition: For any realistic channel, the optimal bias is less than or equal to half the length of the cyclic prefix (i.e., $b_{opt} \leq N_{cp}/2$). This optimal bias results in a higher lock-in probability, on average, than the unbiased UML or CML estimator.

The use of the aforementioned proposition reduces the range of possible optimal biases by half. Further, note that the bound in the aforementioned proposition only depends upon $N_{cp}$, so the coarse STO estimator remains blind.

Simulation Results

Monte Carlo simulations with $10^4$ realizations are used in the following results. In all of the simulations, $\theta=30$, $\epsilon=0$, and only $2N+N_{cp}$ samples are collected at the receiver (i.e., one complete OFDM symbol). BPSK modulation and Rayleigh fading channels are used where the independent and identically distributed channel coefficients (with real and imaginary components normally distributed with variance one-half) are normalized to unit power and remain constant over the duration of a couple of OFDM symbols.

Estimator 1 is chosen as the unbiased STO estimator as discussed in a publication titled "A Joint Blind Timing and Frequency Offset Estimator for OFDM Systems Over Frequency Selective Fading Channels" by Mo, R. et al, *IEEE Trans. Wireless Commun.*, vol. 5, no. 9, pp. 2594-2604, September 2006, given by the equation $$\hat{\theta}_1^* = \underset{\hat{\theta} \in [0, N-1]}{\operatorname{argmax}} \left\{ -\frac{1}{2}\sum_{k=\hat{\theta}+L-1}^{\hat{\theta}+N_{cp}-1} [|r(k)|^2 + |r(k+N)|^2] + \left| \sum_{k=\hat{\theta}+L-1}^{\hat{\theta}+N_{cp}-1} r(k)r^*(k+N) \right| \right\}. \quad \text{(Eq. 8)}$$

Figure 6:
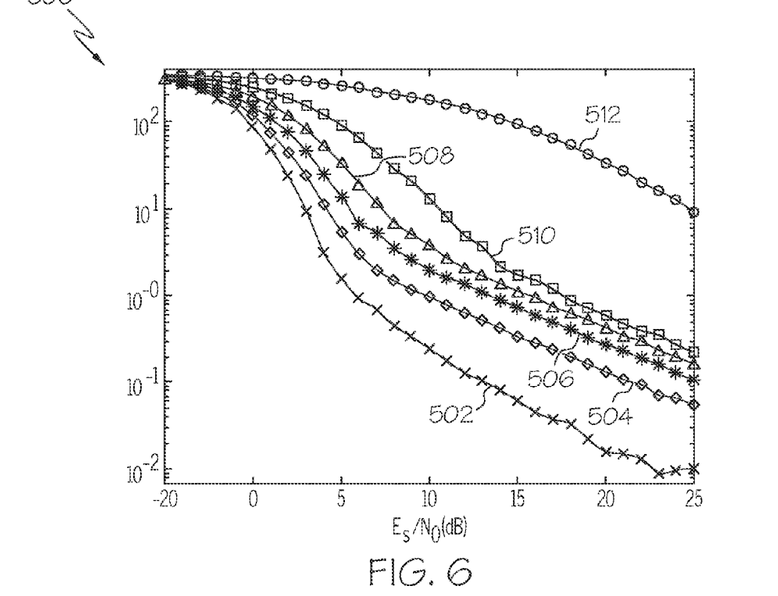
FIG. 6 shows a graph illustrating MSE estimation and variance for an unbiased STO estimator.

Estimator 1 was chosen because it is unbiased, only uses knowledge of the channel order, and performs well in multipath channels. FIG. 6 shows a graph 500 illustrating the MSE and variance of Estimator 1 for different channel orders. As shown in graph 500, line 502 represents the MSE and variance (VAR) for L=1, line 504 represents the MSE and VAR for L=3, line 506 represents the MSE and VAR for L=6, line 508 represents the MSE and VAR for L=9, line 510 represents the MSE and VAR for L=12, and line 512 represents the MSE and VAR for L=15. It is clear that Estimator 1 is an unbiased estimator since the MSE equals its variance.

The biased version of Estimator 1 is given by subtracting the optimal bias (Eq. 7) from $\hat{\theta}_1^*$, thus yielding the biased estimate $$\hat{\theta}_{b,1}^* = \hat{\theta}_1^* - b_{opt,1} \quad \text{(Eq. 9)}$$

Figure 7:
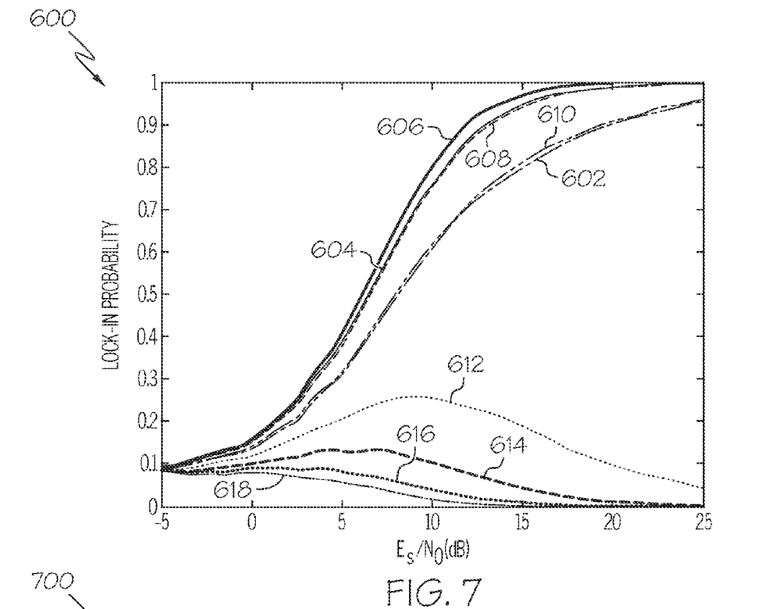
FIG. 7 shows a graph illustrating the lock-in probability for an unbiased STO estimator where the number of samples of the cyclic prefix is eight.

Simulations verified that the optimal bias always resulted in the highest lock-in probability. One example is shown in graph 600 of FIG. 7. In this simulation, L=5 and $N_{cp}$=8. Using Eq. 6, the bias value is varied from 0 to 4 (5 through 8 are shown for completeness). As shown in FIG. 7, line 602 represents a bias b=0, line 604 represents b=1, line 606 represents b=2, line 608 represents b=3, line 610 represents b=4, line 612 represents b=5, line 614 represents b=6, line 616 represents b=7, and line 618 represents b=8.

The optimal bias value (Eq. 7) of 2 results in the highest lock-in probability. Note that the bias values that satisfy (Eq. 6) with the equality constraints removed (i.e., $L-1-N_{cp} < b < 0$) result in estimators with higher lock-in probabilities than the unbiased estimator. This makes sense because it is desirable to avoid the edge of the lock-in region (which is a fallacy of the unbiased estimator), so that more estimates fall into the lock-in region. This is also confirmed by FIG. 7, where the bias values from 1 to 3 all perform better than the unbiased estimator.

Figure 8:
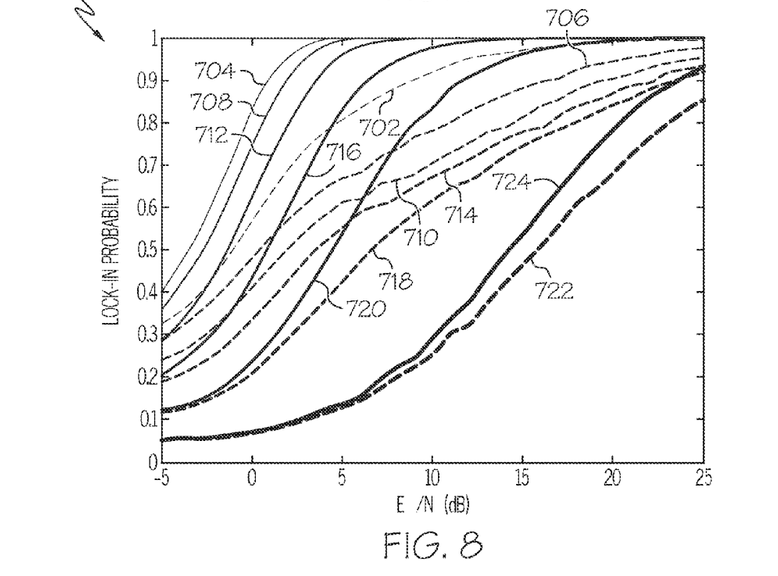
FIG. 8 shows a graph illustrating lock-in probability for an unbiased STO estimator where the number of samples of the cyclic prefix is sixteen.

FIG. 8 shows a graph 700 of the lock-in probabilities of Estimator 1 and the optimally biased estimator for different channel orders. As shown in graph 700, line 702 represents Estimator 1 (E1) for L=1, line 704 represents the biased estimator (BE) for L=1, line 706 represents E1 for L=3, line 708 represents BE for L=3, line 710 represents E1 for L=6, line 712 represents BE for L=6, line 714 represents E1 for L=9, line 716 represents BE for L=9, line 718 represents E1 for L=12, line 720 represents BE for L=12, line 722 represents E1 for L=15, and line 724 represents BE for L=15.

Figure 9:
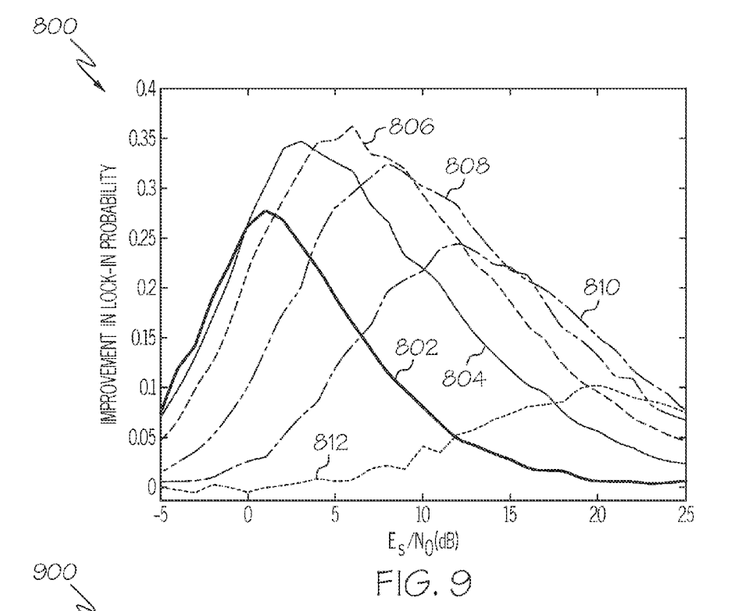
FIG. 9 shows a graph illustrating the improvement in lock-in probabilities from FIG. 8.

FIG. 9 shows a graph 800 of the improvement in lock-in probabilities based on FIG. 8. Each curve in FIG. 9 is equal to the lock-in probability of the optimally biased estimator minus the lock-in probability of Estimator 1. As shown in FIG. 9, line 802 represents the improvement for L=1, line 804 represents the improvement for L=3, line 806 represents the improvement for L=6, line 808 represents the improvement for L=9, line 810 represents the improvement for L=12, and line 812 represents the improvement for L=15. For a fixed N and $N_{cp}$, it can be seen that the differences vary depending on the SNR and L. L=1, 3, 6, 9, and 12 all achieve an improvement in lock-in probability of greater than 24%. These improvements are realized at various SNRs in the low to medium SNR range Also, from FIG. 9, the shift to the right of each optimally biased curve as L increases shows that a higher SNR is needed to achieve a given lock-in probability as the channel order increases.

Figure 11:
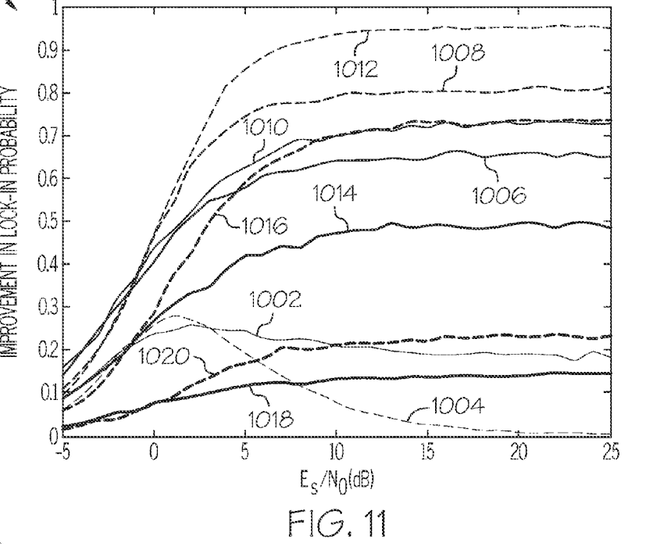
FIG. 11 shows a graph illustrating the improvement in lock-in probabilities for the UML and CML estimators by varying the channel order.

FIG. 11 shows a graph 1000 of how the improvement in lock-in probability (i.e., the difference between the lock-in probabilities of the optimally biased estimator and unbiased estimator) for the UML and CML estimators varies with the channel order. As shown in FIG. 11, line 1002 represents the improvement for UML and L=1, line 1004 represents the improvement for CML and L=1, line 1006 represents the improvement for UML and L=4, line 1008 represents the improvement for CML and L=4, line 1010 represents the improvement for UML and L=8, line 1012 represents the improvement for CML and L=8, line 1014 represents the improvement for UML and L=12, line 1016 represents the improvement for CML and L=12, line 1018 represents the improvement for UML and L=16, and line 1020 represents the improvement for CML and L=16.

The large improvements in lock-in probability for both estimators occur for multipath channels satisfying $N_{cp}-L>1$. These large improvements in lock-in probability plateau for higher SNR because of the plateau in estimation variance of the unbiased estimator due to the finite cyclic prefix region.

Figure 12:
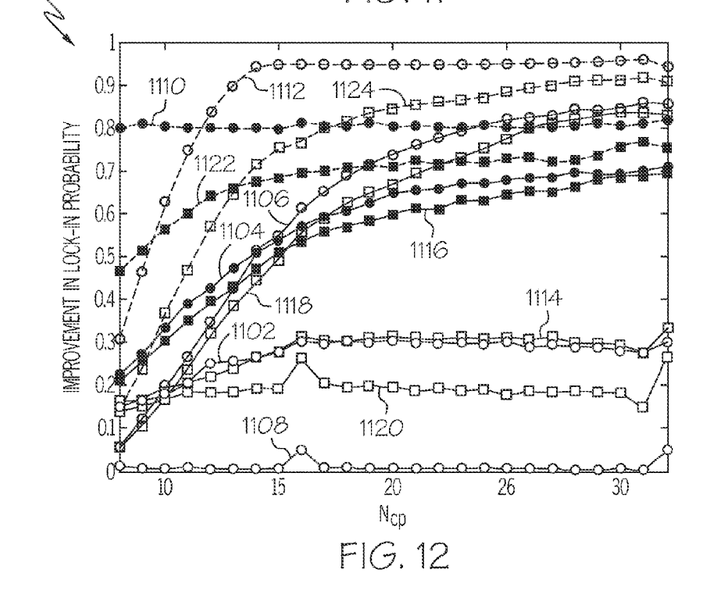
FIG. 12 shows a graph illustrating the improvement in lock-in probabilities by varying the cyclic prefix length for the CML and UML estimators.

Complementary to FIG. 11, FIG. 12 shows a graph 1100 looking at the improvement in lock-in probability for the UML and CML estimators by holding the channel order fixed and varying the length of the cyclic prefix. As shown in FIG. 12, line 1102 represents a CML estimator (CE), channel order (CO)=0, and L=1, line 1104 represents CE, CO=0, and L=4, line 1106 represents CE, CO=0, and L=8, line 1108 represents CE, CO=20, and L=1, line 1110 represents CE, CO=20, and L=4, line 1112 represents CE, CO=20, and L=8, line 1114 represents UML estimator (UE), CO=0, and L=1, line 1116 represents UE, CO=0, and L=4, line 1118 represents UE, CO=0, and L=8, line 1120 represents UE, CO=20, and L=1, line 1122 represents UE, CO=20, and L=4, and line 1124 represents UE, CO=20, and L=8.

Note that the CML estimator's lock-in probability improves more than the corresponding UML estimator for L>1. L=1 is the channel order that sees the least improvement in lock-in probability with increasing $N_{cp}$. For higher order channels at high SNR, the improvement in lock-in probability increases with increasing $N_{cp}$, but eventually plateaus at various values of $N_{cp}$. This plateau is again caused by the aforementioned plateau in estimation variance of the unbiased estimator. On the contrary, the improvement in lock-in probability increases with increasing $N_{cp}$ for higher order channels at low SNR. For example, the improvement in lock-in probability for the CML estimator (L=8) plateaus at high SNR for $N_{cp} \geq 14$, but does not plateau for low SNR.

Figure 13:
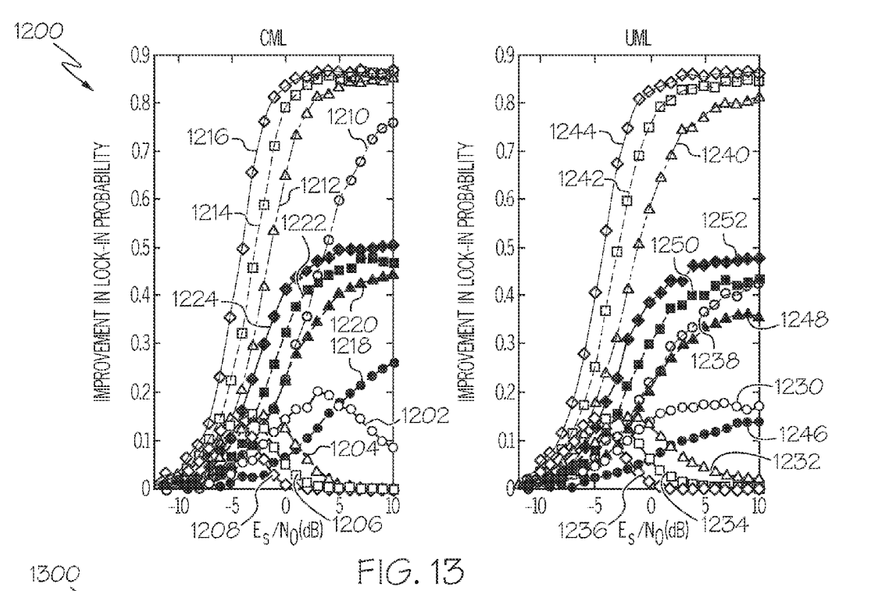
FIG. 13 shows a graph illustrating the improvement in lock-in probabilities by varying the number of symbols used for the CML and UML estimators.

FIG. 13 shows a graph 1200 illustrating the improvement in lock-in probability for the UML and CML estimators as the number of symbols used increases. As shown in FIG. 13, line 1202 represents CE, a number of symbols (nSym)=1 and L=1, line 1204 represents CE, nSym=5, and L=1, line 1206 represents CE, nSym=10, and L=1, line 1208 represents CE, nSym=20 and L=1, line 1210 represents CE, nSym=1 and L=4, line 1212 represents CE, nSym=5, and L=4, line 1214 represents CE, nSym=10, and L=4, line 1216 represents CE, nSym=20 and L=4, line 1218 represents CE, nSym=1 and L=8, line 1220 represents CE, nSym=5 and L=8, line 1222 represents CE, nSym=10 and L=8, line 1224 represents CE, nSym=20 and L=8, line 1230 represents UE, nSym=1 and L=1, line 1232 represents UE, nSym=5, and L=1, line 1234 represents UE, nSym=10, and L=1, line 1236 represents UE, nSym=20 and L=1, line 1238 represents UE, nSym=1 and L=4, line 1240 represents UCE, nSym=5, and L=4, line 1242 represents UE, nSym=10, and L=4, line 1244 represents UE, nSym=20 and L=4, line 1246 represents UE, nSym=1 and L=8, line 1248 represents UE, nSym=5 and L=8, line 1250 represents UCE, nSym=10 and L=8, and line 1252 represents UE, nSym=20 and L=8.

Note that for L>1, the curves shift to the left and up as the number of symbols used increases; the leftward shift shows that the optimal bias increases the lock-in probability for lower SNR as the number of symbols used increases, and the upward shift shows that the improvement in lock-in probability increases as the number of symbols used increases. However, the change in improvement in lock-in probability diminishes as the number of symbols used increases.

Figure 14:
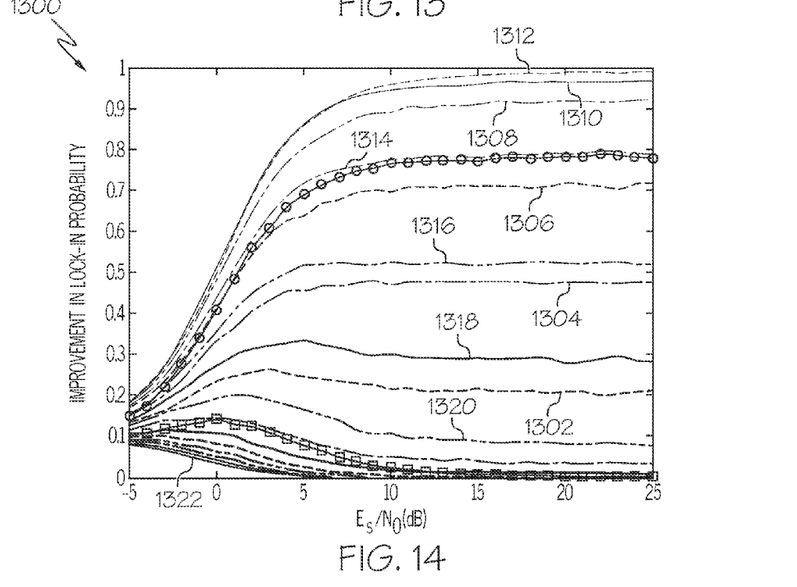
FIG. 14 shows a graph illustrating the lock-in probability of a biased CML estimator and the probability that an optimally biased estimator results in higher or lower lock-in probability.

In FIG. 14, a specific channel model (3GPP rural area channel model-Rax) is used to demonstrate the proposition that for any realistic channel, the optimal bias is less than or equal to half the length of the cyclic prefix. Differing from the previous figures, N=64, $N_{cp}$=16, and the Rax model is used, which is effectively a twelfth order channel for an OFDM system bandwidth of 20 MHz (similar to the IEEE 802.11a signal standard).

FIG. 14 shows a graph 1300 illustrating the lock-in probability for the CML estimator by varying the bias value from 0 to $N_{cp}$. As shown, line 1302 represents a bias b=0, line 1304 represents b=1, line 1306 represents b=2, line 1308 represents b=3, line 1310 represents b=4, line 1312 represents b=5, line 1314 represents b=6, line 1316 represents b=7, line 1318 represents b=8, line 1320 represents b=9, and line 1322 represents b=16. $b_{opt}$=5≤$N_{cp}$/2 results in the highest lock-in probability of greater than 98% for SNR≥15 dB. Further, the probability that the optimally biased estimator results in higher or lower lock-in probabilities when compared to the unbiased estimator for each realization in the Monte Carlo simulation is depicted by the black line with circles and the black line with squares, respectively. For higher SNR, the optimal bias results in a higher lock-in probability almost 79% of the time and rarely ever results in a lower lock-in probability.

Figure 15:
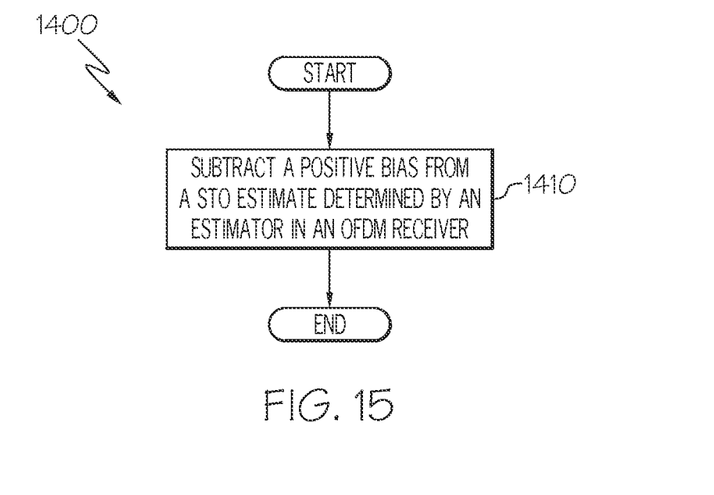
FIG. 15 shows a flowchart of an embodiment of a method in accordance with the Biased Estimation of Symbol Timing Offset in OFDM Systems.

FIG. 15 shows a flowchart of an embodiment of a method 1400 in accordance with the Biased Estimation of Symbol Timing Offset in OFDM Systems. As an example, method 1400 may be performed by system 100 shown in FIG. 2, system 200 shown in FIG. 3, or system 300 shown in FIG. 4, using signal 10 as shown in FIG. 1. Method 1400 includes step 1410, which involves subtracting a positive bias, such as that generated by component 250 shown in FIG. 2 or components 318, 324, or 330 shown in FIG. 4, from a STO estimate $\hat{\theta}^*$ determined by an estimator, such as estimators 246 shown FIG. 3 and 314 shown in FIG. 4, in an OFDM receiver.

Method 1400 may be implemented as a series of modules, either functioning alone or in concert, with physical electronic and computer hardware devices. Method 1400 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Biased Estimation of Symbol Timing Offset in OFDM Systems are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the step of:
using a processor contained within an orthogonal frequency division multiplexing (OFDM) receiver to subtract a positive bias from a symbol timing offset (STO) estimate determined by an estimator in the OFDM receiver, wherein the OFDM receiver has $N_{cp}/2+1$ parallel channels, where $N_{cp}$ is the number of samples of a cyclic prefix of a received OFDM symbol, wherein the positive bias is less than or equal to half the length of a cyclic prefix of the received OFDM symbol, wherein the positive bias is different for each channel.

2. The method of claim 1, wherein the positive bias is determined based upon an order of a channel between an OFDM transmitter and a received OFDM symbol.

3. The method of claim 2, wherein the positive bias is calculated according to the equation $$b = -\frac{L-1-N_{cp}}{2},$$

where L is the order of the channel between the OFDM transmitter and the received OFDM symbol.

4. The method of claim 1, wherein the estimator is one of a blind estimator, a coarse estimator, and a blind coarse estimator.

5. The method of claim 1 further comprising the step of performing a sliding digital Fourier transform subsequent to the step of subtracting a positive bias from the STO estimate.

6. A system comprising:
a processor contained within an orthogonal frequency division multiplexing (OFDM) receiver, the processor configured to subtract a positive bias from a symbol timing offset (STO) estimate determined by an estimator in the OFDM receiver, wherein the positive bias is calculated according to the equation $$b = -\frac{L-1-N_{cp}}{2},$$

where L is an order of the channel between an OFDM transmitter and the received OFDM symbol and $N_{cp}$ is the number of samples of a cyclic prefix of the received OFDM symbol.

7. The system of claim 6, wherein the estimator is one of a blind estimator, a coarse estimator, and a blind coarse estimator.

8. The system of claim 6, wherein the OFDM receiver has $N_{cp}/2+1$ parallel channels, wherein the positive bias is different for each channel.

9. The system of claim 6, wherein the processor is further configured to perform a sliding digital Fourier transform subsequent to subtracting a positive bias from the STO estimate.

10. A system comprising:
a processor contained within an orthogonal frequency division multiplexing (OFDM) receiver, wherein the OFDM receiver has $N_{cp}/2+1$ parallel channels, where $N_{cp}$ is the number of samples of a cyclic prefix of a received OFDM symbol, wherein the processor configured to subtract a positive bias from a symbol timing offset (STO) estimate determined by a coarse estimator in the OFDM receiver, wherein the positive bias is less than or equal to half the length of a cyclic prefix of the received OFDM symbol, wherein the positive bias is different for each channel.

11. The system of claim 10, wherein the processor is further configured to perform a sliding digital Fourier transform subsequent to subtracting a positive bias from the STO estimate.

* * * * *